May 3, 1927.
K. D. JAMES
1,626,611
VARIABLE TRANSMISSION GEARING
Filed Oct. 12, 1925      3 Sheets-Sheet 1
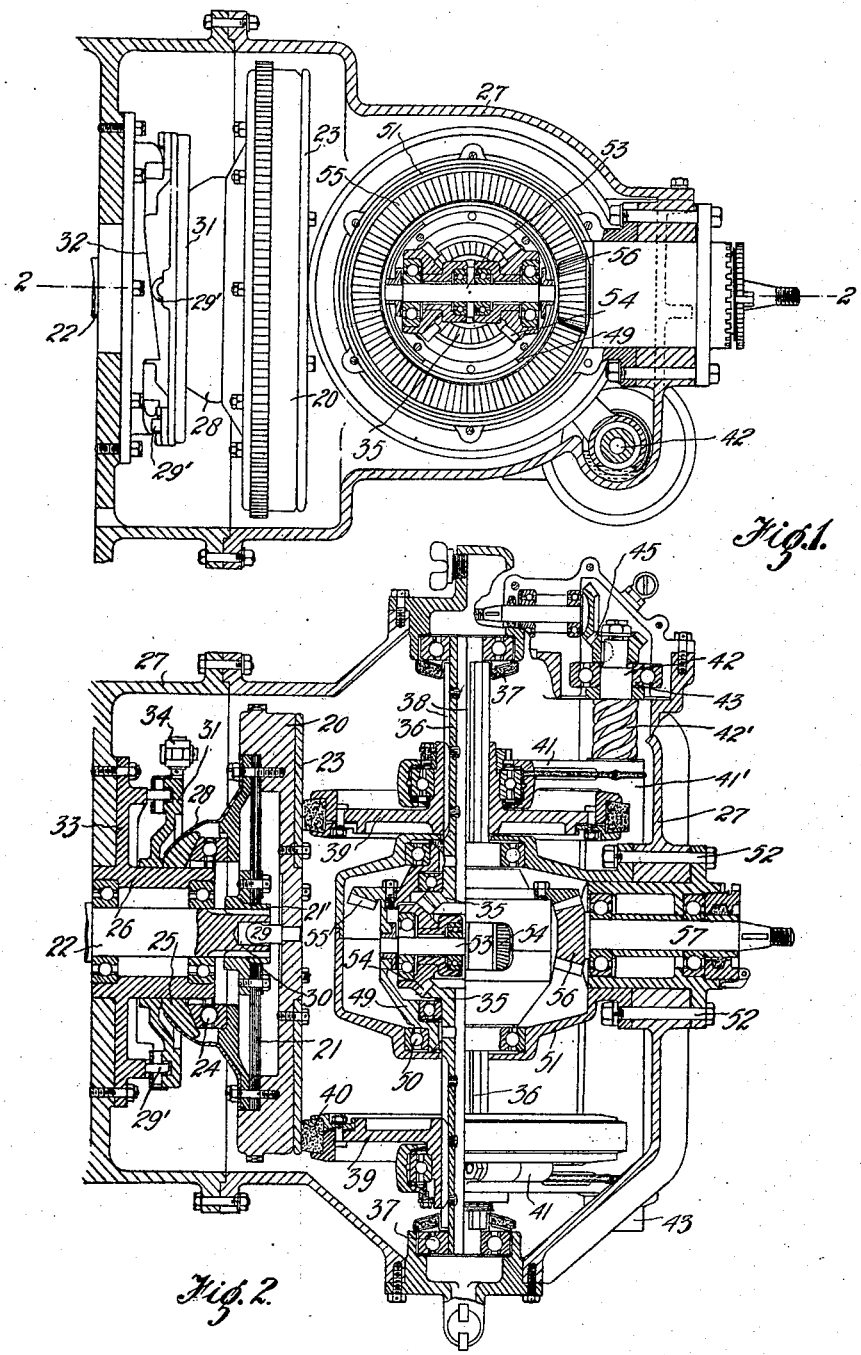
Inventor:
Keith D. James -
By Kent W. Wonnell Atty.

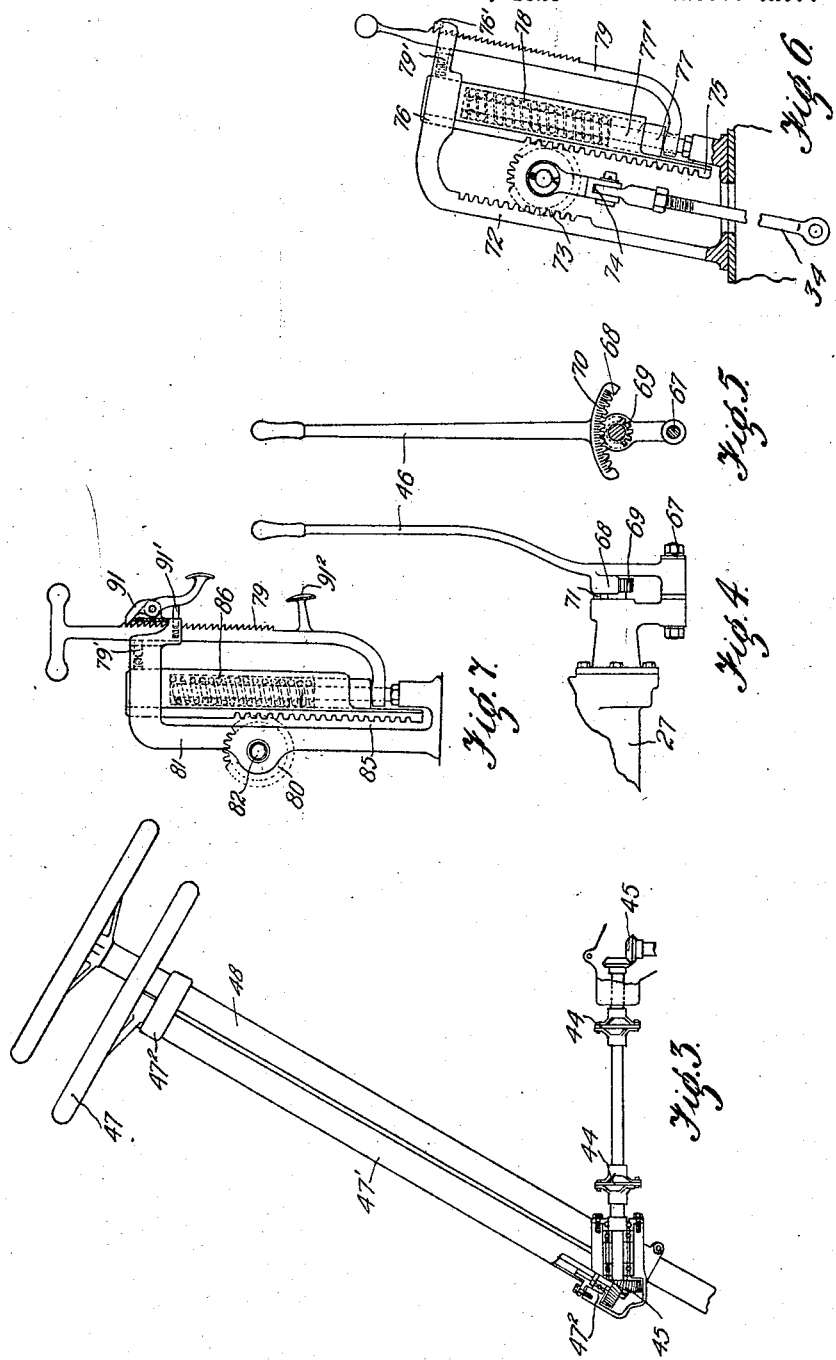

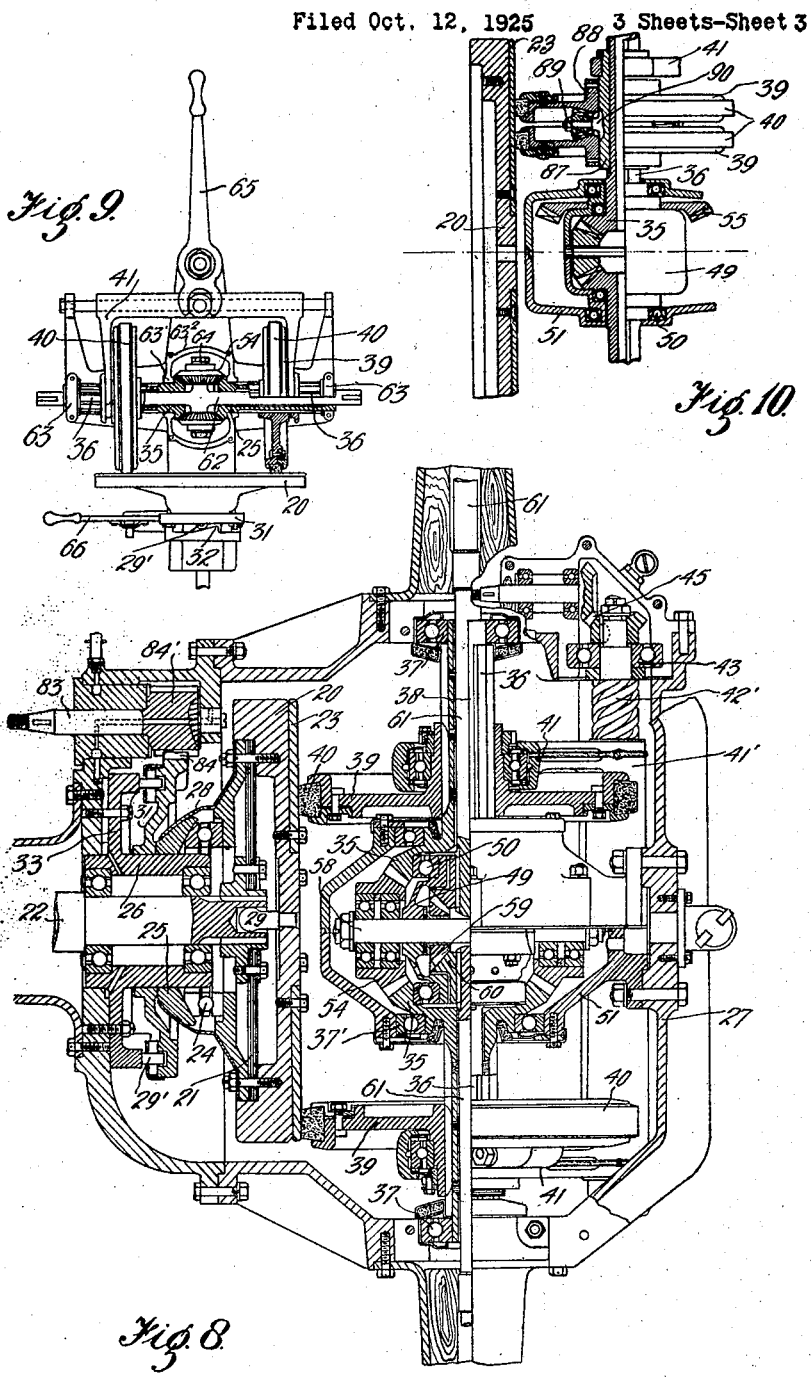

Patented May 3, 1927.

1,626,611

UNITED STATES PATENT OFFICE.

KEITH DUDLEY JAMES, OF HOBART, TASMANIA, AUSTRALIA.

VARIABLE-TRANSMISSION GEARING.

Application filed October 12, 1925, Serial No. 61,985, and in Australia April 24, 1925.

This invention relates to an improved variable transmission gear and refers especially to power transmission gearing applicable for the drive of motor cars, machine tools such as lathes, planers, or any other machine or apparatus wherein a wide variation of speed is required.

Now the object of this invention is to provide a variable transmission gear having a constant power transmitting capacity and which will be capable of a gradual and continuous variation of speed from zero up to a maximum predetermined ratio in both forward and reverse directions.

I accomplish the abovementioned object by providing a variable transmission gear which comprises a driving disc adapted to be rotated directly by or through gearing from a driving shaft, a pair of friction discs adapted to engage the face of the driving disc, one on each side of the centre thereof, the same being slidably mounted on but constrained to rotate with a pair of gears supported in bearings arranged parallel to and in advance of the face of the said driving disc, and two or more epicyclic gears mounted on a rotatable transmission member and adapted to engage the firstmentioned gears. Means are provided whereby the friction discs may be traversed in unison across the face of the driving disc whereby they will be caused to rotate at differential speeds in opposite directions in order to rotate the said cage through the epicyclic gears.

Means are provided for maintaining a constant working pressure on the driving disc to hold the same in gear and take up wear. Means are provided also for enabling the driving disc to automatically align itself with the faces of the friction discs and thereby compensate for any irregularities in wear or manufacture.

In the following specification the invention has been described with reference to drawings illustrating certain adaptations of the same to motor propelled vehicles but it will be readily understood that such adaptations are given by way of examples only and that the scope of the invention is not confined thereto.

In these drawings:

Figure 1 is a view in sectional side elevation of a variable transmission gear constructed in accordance with the invention and adapted for use in a motor propelled vehicle.

Figure 2 is a view in sectional plan taken on the line 2—2 of Figure 1.

Figure 3 is a view in side elevation of one form of device designed to control the transmission gear shown in Figure 1.

Figures 4 and 5 are views in end elevation and side elevation, respectively, of an alternative form of control mechanism.

Figures 6 and 7 are views in elevation of alternative devices for applying and maintaining a working pressure between the driving disc and friction discs.

Figure 8 is a view in sectional plan of one form of the invention wherein the same is combined with the differential gear of a motor car.

Figure 9 is a view in elevation of yet another form of transmission gear especially adapted for machine tools and the like.

Figure 10 is a view in sectional elevation of a modified construction of the invention for transmitting heavy drives and hereinafter is fully described.

Referring to Figures 1 and 2 of the drawings, wherein a driving disc 20 is adapted to be driven through a flexible or resilient coupling (such as a leather or fabric disc and coupling flange 21) from the crankshaft 22 of an engine (not shown) or other rotating driving member. The driving face of the said disc 20 is preferably provided with reversible wearing rings 23 removably attached thereto.

The disc 20 is provided with a self-aligning anti-frictional thrust bearing 24 which bears against the concaved face of a guide member 25 slidably mounted on a boss 26 which is concentrically arranged about the end of the crank-shaft 22 and is rigidly attached to the inside of a casing 27 surrounding and supporting the same. A spherical grease or oil retaining member 28 is attached to the rear of the said driving disc 20 in such a manner that the said disc can oscillate slightly without interfering with the transmission of power from the crank-shaft 22, and a centering pin 29 having a ball shaped head is carried by the disc and is engaged by a hole 30 formed axially in the end of the crankshaft. A pressure ring 31 is mounted freely on the said boss 26 at the rear of the guide member 25 and the said ring is provided with a series of rollers 29' adapted to traverse a corresponding series of cam faces 32 arranged on a circular member 33 rigidly attached to the interior of the casing 27.

One end of a link 34 is connected to the periphery of the pressure ring 31 and its opposite end is connected to means hereinafter described for applying a partial rotation to the pressure ring to cause the rollers 29' to run up the cam faces 32 and move the said ring axially to take up wear on and transmit pressure to the said driving disc 20.

A pair of bevel pinions 35 having a common apex point is provided with elongated bosses 36 (disposed parallel to the face of the driving disc 20) which are mounted in suitable antifriction bearings 37 positioned in advance thereof. The said bosses 36 are provided with splines 38 or are otherwise suitably designed so that a pair of friction discs 39 will be free to slide thereon and at the same time be constrained to move angularly therewith.

The friction discs 39 are made preferably of cast metal such as aluminium and are provided with angularly disposed flanges one of which is removable, as shown, in order that a fibre friction ring 40 may be inserted and gripped therebetween. The fibre friction rings 40 may be split or alternatively may be made in halves in order to facilitate the removal of the same from the friction discs for the purpose of renewal.

A shifting fork 41 of suitable design is associated with the friction discs 39 in such a manner that they can be moved in unison backwards and forwards across the face of the driving disc for the purpose of varying the speed ratio of the transmission gear, as desired.

The shifting fork 41 is operated by means of a screw shaft 42 the screw 42' thereon having a single or multiple start and the said shaft is carried in bearings 43 mounted in the gear casing 27; the said screw being adapted to engage a corresponding nut 41' rigidly attached to or formed integrally with the said fork 41.

When this invention is applied to a motor car the screw may be rotated through universal joints or flexible couplings 44 and suitable bevel or skew gearing 45 from a control lever 46, (see Figures 4 and 5) positioned conveniently to the operator or alternatively by a segmental member 47 mounted on a shaft inside column 47' which is supported in bearings $47^2$ arranged parallel and in close proximity to the steering column 48 of the said motor car as shown in Figure 3, of the drawings.

A cage 49 formed in two sections is mounted in bearings 50 housed in a box 51 rigidly attached to the casing 27 by means of bolts 52 and the said cage supports the inner ends of the elongated bosses 36 of the bevel pinions 35 which are located in the interior thereof. The cage is provided with a diametrically disposed pin 53 or two or more radially disposed pins upon the ends of which are mounted epicyclic bevel pinions 54 constantly in mesh with the above-mentioned pinions 35. A bevel crown wheel 55 is rigidly secured to the said cage 49 and the same engages a bevel pinion 56 formed on the end of the spindle 57 which is adapted to be suitably coupled to a Cardan shaft or the like.

As above described, the invention is suitable for application to existing motor cars in which case it would replace the gear-box and friction clutch at present in use, it being understood that as the driving disc 20 rotates, the friction discs 39 in contact therewith are rotated in opposite directions; if the angular velocities of the discs 39 are equal, which is the case when the same are at equal distances from the centre of the driving disc 20, the gear is in the neutral position and the epicyclic pinions 54 are merely rotated about their own axes no resultant movement being imparted to the cage 49 carrying the same.

However, when the friction discs are traversed from the neutral position across the face of the driving disc 20 by means of the shifting fork 41 and the mechanism associated therewith as above described, they will be caused to rotate at different speeds depending on their respective distances from the centre of the disc 20, and the cage 49 carrying the epicyclic pinions 54 will be rotated at half the difference of the angular velocities of the said friction discs, as in ordinary differential gear mechanism. It will be obvious that the rotation of the driven shaft 57 will be reversed if the friction discs 39 are moved across to the other side of the neutral position on the driving disc 20. Suitable antifriction bearings and lubrication devices are employed so that losses through friction may be reduced to a minimum and ventilation and drain holes are provided in the casing 27.

In the form of control mechanism shown in Figures 4 and 5 a vertical lever 46 is pivotally mounted on a pin 67 carried on a member rigidly attached to the casing 27 and positioned conveniently to the driver. The lever is provided with a curved toothed segment 68 which engages a pinion 69 secured to the end of the screw shaft 42 which operates the shifting fork 41 or alternatively the said pinion 69 may be attached to a spindle arranged in geared relationship therewith as shown in Figures 2 and 8.

The face of the toothed segment 68 is preferably serrated as shown at 70 and a spring operated plunger 71 carried on a portion of the casing 27 or member attached thereto is adapted to frictionally engage and retain the same in any desired position.

When this form of control is adopted, the lever 46 is adapted to be moved forward or backward to control the speed ratios between forward and reverse limits as desired.

In Figure 6 where one form of device for maintaining a pressure on the driving disc 20 is shown, a rack 72 is rigidly supported on the gear casing or other convenient part of a car. A pinion 73 is freely supported on the end of a rod 74 connected by universal or pivotal joints with the link 34 attached to the periphery of the pressure ring 31 which carries the series of rollers 29' and is adapted to constantly engage the teeth of the fixed rack 72. A spring tensioned rack 75 movable in a guide 76 engages the other side of the pinion 73 and exerts thereon a constant force which is transmitted to the pressure ring 31 thereby causing the rollers 29' to mount or tend to mount the inclined faces 32 formed on the aforesaid stationary circular member 33 and thereby exert an axial force on the driving disc 20.

A plunger 77 is mounted on a guide member 77' rigidly associated with the fixed rack 72 and one end of a spring 78 carried in a bore in the movable rack 75 bears thereon. An arm 79 is mounted on the guide member and has a series of ratchet teeth formed thereon which are adapted to engage a tooth 76' formed on or attached to the guide member 76 in such a manner that by raising or lowering the hand lever the driver can apply greater or less pressure to the driving disc 20. The spring 78 is of such strength that when it is compressed solid it exerts the correct maximum pressure. The teeth on the arm 79 are maintained in engagement with the tooth 76' by a spring controlled thrust member 79'.

In a modification of the invention as shown in Figure 8 the variable transmission gear is combined with the differential gear in the rear axle of a motor car and is supported in a casing surrounding the said back axle and preferably in the centre thereof.

The friction discs 39 are mounted on splines 38 formed on the hollow bosses 36 of the bevel pinions 35 which are carried in bearings 37 and 37'. A cage 49 is provided and is supported in antifriction bearings 50 carried by the inner ends of the said bevel pinions 35.

The cage 49 is provided with a diametrically disposed pin 58 which projects through the same, and epicyclic bevel pinions 54 are mounted on antifrictional bearings on the portion of the pin 58 extending beyond the cage. The bevel pinions 54 are in constant engagement with the abovementioned bevel pinions 35 for the purpose hereinbefore described, and another series of epicyclic bevel pinions 59, comprising the usual differential or compensating gear, are mounted freely on the pin 58 inside the cage 49 and the same are in constant gear with a pair of bevel gears 60 carried on splines formed on the inner ends of the divided axle 61, which passes through the hollow bosses 36 of the bevel pinions 35 and the said axles are provided with the usual road wheels (not shown).

In this design the periphery of the pressure ring 31 is provided with a series of gear teeth 84, which may be straight but are preferably of helical design and the said ring is adapted to be rotated by means of a corresponding pinion 84' mounted on or formed integrally with a spindle 83 which is carried in bearings in the casing 27. The spindle 83 is preferably connected to a pressure control device of the type shown in Figure 7, and hereinafter fully described.

When the periphery of the pressure ring 31 is provided with a series of gear teeth 84' as illustrated in Figure 8 of the drawings, I mount a pinion 80 (see Figure 7) on a member 81 positioned conveniently to the driver.

The pinion 80 is mounted on a spindle 82 which is connected by universal joints or the like (not shown) to the spindle 83 carrying the pinion 84' in mesh with the teeth 84 on the pressure ring 31 and the said pinion engages a rack 85 movable in the guide member 81 to which pressure is applied by means of a spring 86, the said pressure being adjustable by the operation of the notched arm 79.

In order to obtain a quick release (if desired) for the pressure control device the notched arm 79 may be engaged by an oscillatable or movable combination tooth and pedal 91 carried on the guide member 81 or 72 and held in engagement with 79 by spring plunger 91'. Alternatively a pad $91^2$ may be formed integrally with member 79 to enable quick release by foot pressure.

In another modification of the invention, especially applicable to machine tools and the like, see Figure 9 the bevel pinions 35 having the extended bosses 36 are mounted freely on a spindle 62 supported in suitable bearings 63 and 63'. The said spindle is provided in the centre thereof with a pair of radial pins 64 rigidly attached thereto or formed integrally therewith, and the epicyclic bevel pinions 54 are mounted freely thereon, and the drive to the operative mechanism, may be taken from either end of the said spindle 62. The gearing runs in oil tight casing $63^2$.

A hand lever 65 is provided to operate the shifting fork 41 for traversing the friction discs 39 across the driving disc 20 and thus alter the speed ratio, and another hand lever 66 is provided in order to adjust the pressure on the driving disc 20 by partially rotating the pressure ring 31 carrying the rollers 29' as described in reference in Figures 1, 2, and 8.

In an alternative construction a spring tensioned pressure control device of the type shown in Figure 6 or Figure 7 may be utilized.

In Figure 10 of the drawings, an application of the invention is illustrated which is especially adapted for the transmission of heavy drives.

In this design two pairs of friction discs 39 are mounted on each side of the centre of the driving disc 20 and in order to avoid friction losses through slipping due to their different angular velocities each pair is mounted freely on a boss or carrier 87 which is free to slide axially on, but is constrained to move angularly with the elongated bosses 36 of the bevel pinions 35. The bosses 88 of the friction discs 39, are provided with bevel teeth having a common apex point and the same are constantly in mesh with epicyclic pinions 89 mounted freely on pins 90 projecting radially from the said boss or carrier 87 in such a manner that when the friction discs 39 are in contact with the driving disc 20 and rotating at different speeds, due to their different positions in relation to the centre of the same, the boss or carrier 87 will rotate at the mean speed of the two discs. A parallel pinion type of differential may be used to obviate end thrust and need of special thrust bearings.

It will be understood that when the invention is embodied in a motor car the gearing may be used as a brake by gradually traversing the discs to neutral position thus dispensing with the necessity for the ordinary brakes. The device shown in Figure 8 may be adapted to a four wheel drive if desired, in which case it is preferably positioned approximately in the centre of the chassis and suitable bevel pinions are provided at the ends of the jack shafts 61 and corresponding bevel pinions are mounted on individual drive shafts for each of the said wheels. Brakes may be fitted outside the last mentioned gears on the jack shafts 61 instead of on the road wheels.

A variable speed gear constructed and arranged in accordance with the invention will be found comparatively economical to manufacture and efficient in operation as the motor car or other vehicle or machine in which it is embodied can start under load with the power unit running at maximum speed, if desired, thus enabling economy of power to be effected and a relatively lower powered engine or power unit to be utilized than has hitherto been possible.

I claim:—

1. A variable power transmission gear comprising a casing, a driving shaft having one end revolvably supported within the casing, a driving disc, a flexible coupling connecting the driving disc to the driving shaft, a self-aligning thrust bearing located between the casing and the driving dics, means for exerting an end thrust on the self-aligning bearing, a pair of oppositely disposed bevel gear wheels having elongated bosses projecting from the outer faces thereof, bearings mounted in the casing and rotatably supporting the elongated bosses, a pair of friction discs slidably and non-rotatively mounted on the elongated bosses, said friction discs bearing on opposite sides of the centre of the driving disc, epicyclic gear wheels meshing with the opposed bevel gear wheels, and a driven shaft adapted to receive its motion from the rotation of the epicyclic gearing about the axis of the elongated bosses.

2. A variable power transmission gear comprising a casing, a drive shaft projecting into the casing, a driving disc flexibly coupled to the inner end of the drive shaft, a hole formed axially in the end of the drive shaft, a pin projecting rearwardly from the centre of the driving disc, a spherical head on the said pin engaged by the hole in the drive shaft, a boss fitted to the casing and surrounding the drive shaft, a pressure ring rotatively mounted on the said boss, a self-aligning thrust bearing located between the pressure ring and the back of the driving disc, rollers on the thrust ring, a series of cam faces on the casing and disposed in the path of the rollers on the pressure ring, means for rotating the pressure ring, a pair of opposed bevel gear wheels having elongated bosses supported in bearings mounted on the casing, friction discs slidably and non-rotatively supported on the elongated bosses of the bevel gear wheels, said friction discs bearing against the opposite sides of the centre of the driving disc, a cage rotatively supported about the bevel gear wheels, epicyclic gear wheels supported within the cage and meshing with the bevel gear wheels, a crown wheel on the cage, and a pinion mounted on a driven shaft and meshing with the crown wheel.

3. In a variable power transmission gear as claimed in claim 1, a casing, a drive shaft projecting into the casing, a driving disc flexibly coupled to the inner end of the drive shaft, a hole formed axially in the end of the drive shaft, a pin projecting rearwardly from the centre of the driving disc, a spherical head on the said pin engaged by the hole in the drive shaft, a boss fitted to the casing and surrounding the drive shaft, a pressure ring rotatively mounted on the said boss, a self-aligning thrust bearing located between the pressure ring and the back of the driving disc, rollers on the thrust ring, a series of cam faces on the casing and disposed in the path of the rollers on the pressure ring, and means for rotating the pressure ring.

4. In a variable power transmission gear wherein a rotatively mounted driving disc is thrust against a pair of friction discs associated with means for transmitting motion to a driven shaft, a casing, a drive shaft projecting into the casing, a flexible coupling connecting the drive shaft to the driving disc, a boss fitted to the casing and surrounding the drive shaft, a pressure ring rotatively mounted on the said boss, a self-aligning thrust bearing located between the pressure ring and the back of the driving disc, cam shaped bearing faces for the pressure ring, a fixed rack, a pinion engaging the fixed rack, a movable rack meshing with the teeth on the opposite side of the pinion, a link connection between the pressure ring and the pin supporting the said pinion, and means for reciprocating the movable rack in opposition to spring pressure, substantially as described.

5. In a variable power transmission gear wherein a rotatively mounted driving disc is thrust against a pair of friction discs associated with means for transmitting motion to a driven shaft, a casing, a drive shaft projecting into the casing, a flexible coupling connecting the drive shaft to the driving disc, a boss fitted to the casing and surrounding the drive shaft, a pressure ring rotatively mounted on the said boss, a self-aligning thrust bearing located between the pressure ring and the back of the driving disc, cam shaped bearing faces for the pressure ring, a fixed rack, a pinion engaging the fixed rack, a movable rack meshing with the teeth on the opposite side of the pinion, a link connection between the pressure ring and the pin supporting the said pinion, a fixed guide pin, a bore formed longitudinally in the movable rack and accommodating the fixed guide pin, a compression spring surrounding the guide pin, a plunger mounted on the guide pin and adapted to move freely within the bore, and a lever slidably mounted on the guide pin and having notches adapted to engage a fixed retaining member, substantially as described.

6. In a variable power transmission gear wherein a rotatively mounted driving disc is thrust against a pair of friction discs associated with means for transmitting motion to a driven shaft, a casing for the gear, a drive shaft projecting into the casing, a flexible coupling connecting the drive shaft to the driving disc, a boss fitted to the casing and surrounding the drive shaft, a pressure ring rotatively mounted on the said boss, a self-aligning thrust bearing located between the pressure ring and the back of the driving disc, cam shaped bearing faces for the pressure ring, a series of gear teeth formed on the periphery of the pressure ring, a pinion mounted on a spindle and meshing with the series of gear teeth on the pressure ring, a second pinion connected to the spindle, a frame supporting the bearing for the second mentioned pinion, a guide pin supported in the frame, a rack slidably mounted in the frame and having a bore adapted to fit loosely over the guide pin, a helical compression spring and thrust block on the guide pin, a control lever adapted to operate the rack, and toothed notches and a pawl for retaining the control lever in an adjusted position.

7. In a variable power transmission gear as claimed in claim 6 foot controlled means for releasing the control lever to remove pressure from the driving disc.

8. In a variable power transmission gear wherein a rotatively mounted driving disc is thrust against a pair of friction discs associated with means for transmitting motion to a driven shaft, a shifting fork for traversing the friction discs across the face of the driving disc, a screw engaging a correspondingly threaded portion of the shifting fork, a pinion fitted to the spindle carrying the screw, a second pinion meshing with the first mentioned pinion, a spindle carrying the second mentioned pinion, a flexible connection between the spindle and a rotating shaft, and means fitted to the steering column of a motor-car for operating gearing for rotating the said shaft.

In witness whereof I hereunto affix my signature.

KEITH DUDLEY JAMES.